(12) United States Patent
Zhao et al.

(10) Patent No.: US 10,035,924 B2
(45) Date of Patent: Jul. 31, 2018

(54) ELIMINATION OF APPLICATION STREAKS OF COATINGS USING SHORT FIBERS

(71) Applicant: Dur-A-Flex, Inc., East Hartford, CT (US)

(72) Inventors: Ming Zhao, East Longmeadow, MA (US); Murty Venkata Bhamidipati, Simsbury, CT (US); Clay Carrington, Willington, CT (US); David Royston Hughes, Fairfield, CT (US)

(73) Assignee: Dur-A-Flex, Inc., East Hartford, CT (US)

( * ) Notice: Subject to any disclaimer, the term of this patent is extended or adjusted under 35 U.S.C. 154(b) by 0 days.

(21) Appl. No.: 15/366,975

(22) Filed: Dec. 1, 2016

(65) Prior Publication Data

US 2017/0158884 A1 Jun. 8, 2017

Related U.S. Application Data

(60) Provisional application No. 62/263,569, filed on Dec. 4, 2015.

(51) Int. Cl.
| | |
|---|---|
| *C08G 18/62* | (2006.01) |
| *C08G 18/70* | (2006.01) |
| *C08K 3/22* | (2006.01) |
| *C09D 7/65* | (2018.01) |
| *C09D 7/40* | (2018.01) |
| *C09D 175/04* | (2006.01) |

(52) U.S. Cl.
CPC ....... *C09D 175/04* (2013.01); *C08G 18/6216* (2013.01); *C08G 18/706* (2013.01); *C09D 7/65* (2018.01); *C09D 7/70* (2018.01); *C08K 3/22* (2013.01); *C08K 2003/2241* (2013.01)

(58) Field of Classification Search
CPC .. C08K 3/22; C08K 2003/2241; C09D 7/125; C09D 175/04; C09D 7/1291; C09D 7/65; C09D 7/70; C08G 18/6216; C08G 18/706
See application file for complete search history.

(56) References Cited

U.S. PATENT DOCUMENTS

| | | | | |
|---|---|---|---|---|
| 5,385,978 A | * | 1/1995 | Evans | ........................ C08J 5/04 428/359 |
| 6,214,450 B1 | | 4/2001 | Wickert et al. | |
| 8,734,940 B2 | | 5/2014 | Teather et al. | |
| 2003/0119948 A1 | | 6/2003 | Kelly et al. | |
| 2006/0159870 A1 | * | 7/2006 | Lenges | ................ C08G 18/281 428/31 |
| 2007/0149656 A1 | | 6/2007 | Rayner | |

FOREIGN PATENT DOCUMENTS

WO 2014099702 A1 6/2014

OTHER PUBLICATIONS

Mania, "Polymer, Fiber, and Filler Formulation Effects upon Ready-to-Use (RTU) Grout" Waterborne Coatings Symposium 2014, Proceedings of the Forty-First Annual International Waterborne, High-Solids, and Powder Coatings Symposium, Feb. 24-28, 2014, pp. 421-443.

* cited by examiner

*Primary Examiner* — Patrick Dennis Niland
(74) *Attorney, Agent, or Firm* — Joseph Suhadolnik

(57) ABSTRACT

Waterborne polyurethane coating compositions comprising a polyol, an isocyanate crosslinker, and a small amount of thermoplastic microfibers, e.g., polyolefin microfibers, having a length of less than 1 mm, exhibit a much less sag, roller lines and other surface imperfections upon application to a substrate, in particular a vertical substrate such as a wall, than analogous water borne polyurethane compositions that lack the microfibers.

12 Claims, No Drawings

ELIMINATION OF APPLICATION STREAKS OF COATINGS USING SHORT FIBERS

The addition of a small amount of very short thermoplastic fibers, e.g., polyolefin microfibers such as polyethylene microfibers, having a fiber length of 1 mm or less and diameter 0.025 mm or less, and often a diameter of less than 0.015 or 0.010 mm, to a water born two pack polyurethane coating comprising a polyol, such as one or more hydroxyl functionalized acrylate or methacrylate resins and an isocyanate crosslinker, e.g., an aliphatic isocyanate crosslinker, results in a sag resistant coating composition that is readily applied by common spreading techniques such as brush or roller to provide a coating film without streaks or striations, which coating is ideal for vertical surfaces such as walls.

BACKGROUND OF THE INVENTION

Roller line or coating streak is a common problem for coatings, such as wall coatings, which makes the coating film aesthetically unacceptable. Roller lines are frequently encountered when the film's appearance is sensitive to differences in coating thicknesses that occur between the roper overlay areas, or when the film's appearance is sensitive to different curing mechanisms, e.g., one coating curing vs. wet to dry two coating curing wherein subsequent passes after initial application disturbs partially cured coating overlay areas. Coating formulations that minimize or eliminate unwanted lines, streaks, brush marks are typically desirable.

Fillers, fibers, cellulose or other components are used in many coating formulations to enhance the physical properties or chemical resistance of the cured coating film. For example, fiber reinforcing agents of various sizes and compositions are often added to coating formulations to improve physical performance and properties such as tensile strength and chemical resistance.

U.S. Pat. No. 6,214,450 discloses a high solids, e.g., about 65% to about 90% by volume solids, water-borne acrylic latex coating, useful as a roof coating, comprising an acrylic latex polymer, hollow particulates and very high pigment volume. Addition of a fiber to improve cohesion and flow characteristics of the coating is recommended. Cellulose fibers having an average length of 0.5 to 2 millimeters and an average fiber diameter of 10 to 20 microns are preferred because the cellulose hydroxyl groups are readily available to form hydrogen bonds with the latex polymer in a dispersion. The cellulose fibers also help to prevent the liquid surface coating from sagging on pitched substrates during drying. Short fibers made of polyethylene are also said to be useful.

Although addition of a filler or fiber can contribute to desirable physical properties of a coating film, it can also have adverse effects on properties such as viscosity or the film's appearance.

WO 2014/099702 discloses a composition comprising (a) at least one liquid resin; (b) a reinforcing modifier comprising flexible short fibers; and (c) a flow modifier comprising hybrid organic-inorganic particles bearing organic or hetero-organic groups that comprise substantially non-interacting groups; wherein the reinforcing modifier and the flow modifier are dispersed in the resin component. The flow modifier is added to the composition to improve the flowability of the resin, which is negatively affected by the presence of the short fibers.

The properties introduced to a coating by addition of a fiber or other filler depend on the composition of the fiber or other filler, and often on their size. For example, nanoparticles and micro fibers can impart a variety of properties to formulations, acting, for example, as rheology or viscosity modifiers, thixotropic agents, thickeners, reinforcing agents etc.

"Polymer, Fiber, and Filler Formulation Effects upon Ready-to-Use Grout", *The Waterborne Symposium: Proceedings of the Forty-First Annual International Waterborne, High-Solids, and Powder Coatings Symposium held in New Orleans, Louisiana*, Feb. 24-28, 2014, p. 421, discusses improving various properties of grout formulations tensile strength, water resistance, stain repellence, cracking and shrinkage by addition of polymers, fibers and fillers. The fibers include fibrous polyethylene, nylon and cellulose.

US 2003/0119948 discloses a chip resistant automotive coating comprising a micro pulp slurry, which micro pulp comprises a fibrous organic material having a volume average length of from 0.01 to 100 micrometers and an average surface area of from 25 to 500 square meters per gram. A wide variety of fibers were said to be useful in the micro pulp, e.g., fibers made from aliphatic polyamides, polyesters, polyacrylonitriles, polyvinyl alcohols, polyolefins, polyvinyl chlorides, polyvinylidene chlorides, polyurethanes, polyfluorocarbons, phenolics, polybenzimidazoles, polyphenylenetriazoles, polyphenylene sulfides, polyoxadiazoles, polyimides, aromatic polyamides, cellulose, cotton or wool. Preferably the fibers were made from aromatic polyamides, polybenzoxadiazole, polyben-zimidazole, most preferably aromatic polyamides, e.g., (p-phenylene terephthalamide), poly(m-phenylene isophthalamide), or a mixture thereof.

US 2007/0149656 discloses a composition for producing a liner, e.g., a load-bearable coating to assist in protecting from rock bursts in a mine, comprising at least one waterborne, non-cellulosic precursor of a polyurethane and at least one wet pulp, for example, a composition comprising (a) at least one water-borne, non-cellulosic polymer dispersion, said polymer bearing groups that are reactive with isocyanate groups; (b) at least one hydrophilic prepolymer bearing isocyanate groups; and (c) at least one wet pulp comprising fibrous material selected from para-aramid fibers and mixtures thereof. "Wet pulp" means fibrous material that is capable of being fibrillated and that comprises at least about 20% by weight water, preferably at least about 40% and more preferably at least about 60 percent by weight water, based on the total weight of the wet pulp.

U.S. Pat. No. 8,734,940 discloses a diffusively reflective paint comprising a paint carrier, hollow and solid microspheres, and macroporous polymeric particles having an average diameter between about 1 micron and about 300 microns for use in reflectors in lighting fixtures. The macroporous polymeric particles are selected from the group consisting of flash spun plexifilamentary film-fibril materials, e.g., spun, high density polyethylene materials such as Tyvek®, microcellular foamed polyester sheets, biaxially-stretched polyester films, and combinations thereof. The paint carrier can further comprise a binder selected from acrylic binders, polyurethane binders, polyester binders and epoxy-based binders, and mixtures thereof. Acrylate binders, hybrid epoxy acrylate binders and a binder comprising a dispersion of a polyurethane resin were exemplified.

There remains a need for a safe, robust, readily mixed coating formulation, suitable for vertical surfaces such as walls, which is readily applied using common methods, and when applied, has an appearance that is less sensitive to thickness differences or other factors which may cause unwanted lines, streaks or other imperfections.

SUMMARY OF THE INVENTION

It has been found that the addition of small amounts of very short thermoplastic fibers, i.e., microfibers that are less than 1 mm in length, to certain waterborne 2 pack polyurethane coating compositions greatly improves the surface characteristics of the coating film that is formed when the coating composition is applied to a surface, particularly a vertical surface, by eliminating or greatly reducing lines or streaks, for example, lines or streaks caused by roller or brush application, and by preventing sag of the coating. Although it can be used to coat a variety of surfaces, the coating of the invention is ideally suited for coating vertical surfaces such as walls. The microfibers of the invention are made from thermoplastic polymers, e.g., polyamides, polyesters, polyacrylates, polyacrylonitriles, polyolefins, polystyrenes, polyvinyl chlorides, polyfluorocarbons or phenolic resins, and in some embodiments the thermoplastic polymer is a non-polar material, such as a polyolefin, polystyrene, polyvinyl chloride or polyfluorocarbon.

For example, in some particular embodiments polyolefin microfibers are used, e.g., polyethylene, polypropylene and the like. While excellent results were obtained when such microfibers are part of the two-pack polyurethane coating of the invention, the addition of these same microfibers to comparable wall coatings based on acrylic and epoxy binder chemistries, did not provide the same improvements, making the results in the 2-pack urethane of the invention very surprising.

The coating composition of the invention comprises a polyol, an isocyanate crosslinker, and thermoplastic microfibers having a fiber length of 1 mm or less and diameter of from 0.001 to 0.025 mm, e.g., a diameter of from 0.001 to 0.10 mm.

In many embodiments the polyol is an oligomeric or polymeric polyol known in the art, e.g., a polyether polyol, polyester polyol, polycarbonate polyol, and co-polymer polyols such as a polyether/polyester polyol, etc. In certain embodiments the polyol is a polymeric or copolymeric resin bearing two or more hydroxyl groups, for example, a hydroxyl bearing polyacrylate, polyacrylamide and the like. For example, in particular embodiments the coating composition of the invention comprises a hydroxy substituted resin, e.g., resins comprising acrylate and/or methacrylate polymers or copolymers comprising free hydroxyl groups.

The isocyanate crosslinker is typically an aliphatic polyisocyanate e.g., hexamethylene diisocyanate or an oligomer or homopolymer of hexamethylene diisocyanate, although other known isocyanate crosslinkers may be used.

In the present application the article "a" or "an" is meant to convey one or more than one unless otherwise noted. For example, the coating composition may contain more than one resin and more than one isocyanate crosslinker may be used.

One embodiment of the invention provides a process for eliminating surface imperfections, such as streaks, lines or sag, from a waterborne 2 pack polyurethane coating film by adding dry thermoplastic microfibers having a fiber length of 1 mm or less and diameter of from 0.001 to 0.025 mm, such as a polyolefin microfibers and the like, e.g., polypropylene, polyethylene, including low density or high density polyethylene microfibers, to a waterborne 2 pack polyurethane coating composition prior to application to a surface, e.g., a vertical surface such as a wall.

DESCRIPTION OF THE INVENTION

In many broad embodiments, the waterborne 2-pack polyurethane coating composition of the invention comprises:
  10 to 60%, e.g., 10 to 50%, by weight based on the total weight of the waterborne polyurethane coating composition of a polyol,
  5 to 60%, e.g., 10 to 50%, of an isocyanate crosslinker,
  0.1 to 5.0%, e.g., 0.2 to 3.0% polyolefin microfibers having a fiber length of 1 mm or less and diameter of from 0.001 to 0.025 mm, e.g., a diameter of from 0.001 to 0.10 mm,
  10 to 40%, e.g., 15 to 35% $TiO_2$, and
  10 to 60%, e.g., 15 to 50% water.

In some embodiments, the waterborne 2-pack polyurethane coating composition of the invention comprises:
  10 to 40%, e.g., 10 to 35% or 15 to 25% of the polyol,
  10 to 40%, e.g., 10 to 35% or 15 to 25% of the isocyanate crosslinker
  0.1 to 5.0%, 0.2 to 3.0% of the thermoplastic microfibers,
  15 to 40%, e.g., 15 to 35% $TiO_2$, and
  15 to 50%, e.g., 25 to 45% water.

Typically the coating will also comprise up to 25%, e.g., 0 to 25% by weight, such as from 3 to 25% or 3 to 20 wt % total of components such as colorants, e.g., pigments, surfactants, dispersants, rheology modifiers, cure accelerators, catalysts, leveling agents and/or anti-foaming agents and other optional components. Other optional components include, e.g., other reactive or non-reactive resins, hardeners, delaying or blocking agent, solvents, reactive diluents, wetting agents, stabilizers, inhibitors, reinforcing agents, cement, sand, quartz (colored or non-colored), silica, clay and/or other fillers (CaCO3, CaSO4, BaSO4, etc.), detergents, antistatic material, anti-slip agent (Al2O3), matting agent, UV blockers, hindered amine light stabilizers, antioxidants, etc.

In general, the 2 pack polyurethane coating composition of the invention are prepared by mixing dry microfibers into a composition comprising water, polyol, crosslinker and any other components desired in the final composition. In some embodiments the crosslinker may be added to the composition separately, e.g., just before, concurrent with, or some time after the microfibers have been added.

As stated above, in many embodiments the polyol is an oligomeric or polymeric polyol e.g., a polyether polyol, polyester polyol, polycarbonate polyol, or co-polymer polyol such as a polyether/polyester polyol, etc., and in certain embodiments the polyol is a polymeric or copolymeric resin bearing two or more hydroxyl groups, for example, a hydroxyl bearing polyacrylate, polyacrylamide and the like. In particular embodiments, the hydroxy substituted polymer resin comprises one or more acrylate or methacrylate polymer or co-polymer comprising a plurality of free hydroxyl groups, many of which resins are commercially available.

Other monomers aside from acrylate or methacrylate monomers may be present in the polymer resin, e.g., vinyl alcohols, vinyl acetates, vinyl amines, unsaturated acids, acrylamides, and polymer segments comprising amide, ester urethane or urea linkages, and the like may be present in the acrylate or methacrylate polymer or co-polymer. In some embodiments, polymers derived from these non acrylic monomers may also be present in the coating composition. For example, the hydroxy substituted polymer resin may comprise a co-polymer comprising different acrylate and/or methacrylate monomers, or a copolymer comprising one or more acrylate and/or methacrylate monomers segments and one or more amide, urethane, polyether, or hydroxy alkylene segments. There is generally no limit on where the free hydroxyl groups are located the polymer, e.g., they may be bound to the polymer backbone or be present on a pendent group such as a pendent ester group, e.g., the hydroxy group form a hydroxy ethyl acrylate or methacrylate monomer unit, a pendent amide group, e.g., from a hydroxyl alkyl acrylamide unit, a pendent hydroxy alkyl group from a vinyl alcohol unit, etc.

A wide variety of polyisocyanate monomers are known and may be used e.g., aliphatic diisocyanates or tri-isocyanates, or aromatic diisocyanates or tris isocyanates. Common aliphatic diisocyanates include 1,6-hexane diisocyanate (HDI), isophorone diisocyanate (IPDI), methylene bis(p-cyclohexyl isocyanate) ($H_{12}MDI$), 1,3-cyclohexyl diisocyanate, 1,4-cyclohexyl diisocyanate (CHDI), tetramethylene 1,4-diisocyanate, hexamethylene 1,4-diisocyanate, 2,2,4-trimethyl-hexamethylene diisocyanate (TMDI), and the like.

Common aromatic diisocyanates include diphenylmethane diisocyanate (MDI), 2,4-toluene diisocyanate (TDI), 2,6-toluene diisocyanate, 3,3'-bitoluene diisocyanate (TODI), diphenyl 4,4'-diisocyanate (DPDI), dibenzyl-4,4'-diisocyanate, 1,3 and 1,4-xylene diisocyanates, tetramethylxylylene diisocyanate ("TMXDI), para-phenylene diisocyanate (PPDI), stilbene-4,4'-diisocyanate, benzophenone-4,4'-diisocyanate, and the like.

Dimers, oligomers and polymers of such isocyanates may also be used.

The isocyanate crosslinker of the invention is typically an aliphatic polyisocyanate, e.g., an alkylene di- or tri-isocyanate or a dimer trimer or higher oligomer of an alkylene di- or tri-isocyanate. In many embodiments, the isocyanate crosslinker comprises hexamethylene diisocyanate or a dimer, trimer, higher oligomer or homopolymer of hexamethylene diisocyanate, for example, the isocyanate crosslinker often comprises hexamethylene diisocyanate and/or hexamethylene diisocyanate trimer Curing of the coating of the invention comprises reaction of hydroxy groups from the polyol, often comprising an acrylate or methacrylate polymer or co-polymer comprising free hydroxyl groups, and the isocyanate crosslinker, typically comprising hexamethylene diisocyanate or a dimer, trimer, higher oligomer or homopolymer of hexamethylene diisocyanate, to form a crosslinked polyurethane polymer.

Thus the polyurethane film formed upon curing of the inventive coating composition is not a film formed by drying a dispersion of an already formed polyurethane resin. It is also not formed by the crosslinking of an isocyanate capped prepolymer formed from the reaction of a polyol with a polyisocyanate monomer.

The microfibers or short fibers of the invention are thermoplastic fibers, often polyolefin, polystyrene, polyvinyl chloride or polyfluorocarbon microfibers, and in particular embodiments polyolefin microfibers such as polyethylene, polypropylene microfibers and the like, for example, high or low density polyethylene fibers. They have a fiber length of 1 mm or less, e.g. 0.001 to 1.0 or 0.005 to 0.50 mm, e.g., 0.010 to 0.50 or 0.010 to 0.25 mm, and diameter of from 0.001 to 0.025 mm, e.g., 0.001 to 0.015 or 0.001 to 0.010 mm, and in some embodiments 0.002 to 0.007 mm. In many embodiments, the microfibers have a surface area of 5 to 20 $m^2/gm$ as determined by gas absorption.

Such microfibers are commercially available, for example, from MiniFibers Inc., under the trade name Short Stuff®. The fibers of the invention are added to the formulation as dry materials, as opposed to being added in a slurry as found in US 2003/0119948 or as the wet pulp or fibers as found in US 2007/0149656. There is no particular limitation as to how or when the fibers are added.

The coating of the present invention can be prepared and applied to a surface using any conventional means including roller, trowel, squeegee, spray, brush, etc., and can be cured at ambient temperatures.

The coating formulation of present invention can be applied directly to a substrate, e.g., concrete, brick, tile, vinyl, other plastics, brick, wood, drywall, metal etc., or it can be applied over another coating film such as over a primer layer. The formulation can be used as primer, sealer, patch, intermediate coat, broadcast coat and top coat. It can also be mixed with cement, aggregates, sands, fillers, pigments, dye, anti-slip agent, anti-static agents and other additives to form a functional coating.

Some embodiments of the invention provide a method for reducing or preventing roller line and/or sag from a waterborne 2 pack polyurethane coating, in particular a wall coating, by adding 0.1 to 5.0%, e.g., 0.2 to 3.0% by weight based on the weight of a waterborne 2 pack polyurethane coating composition, of the dry thermoplastic microfibers described above, for example, dry polyolefin microfibers to a composition comprising:

10 to 60%, e.g., 10 to 50%, by weight based on the total weight of the waterborne polyurethane coating composition, of a polyol, e.g., a polymeric resin comprising hydroxy groups, 5 to 60%, e.g., 10 to 50%, of an isocyanate crosslinker, e.g., an aliphatic isocyanate crosslinker, 10 to 40%, e.g., 15 to 35% $TiO_2$, and 10 to 60%, e.g., 15 to 50% water;

for example, adding the microfibers to a composition comprising:

10 to 40%, e.g., 10 to 35% or 15 to 25% of the polyol, 10 to 40%, e.g., 10 to 35% or 15 to 25% of the isocyanate crosslinker, 0.1 to 5.0%, 0.2 to 3.0% of the thermoplastic microfibers, 15 to 40%, e.g., 15 to 35% $TiO_2$, and 15 to 50%, e.g., 25 to 45% water;

or by adding, in any order, 5 to 60%, e.g., 10 to 50%, 10 to 40%, e.g., 10 to 35% or 15 to 25%, by weight based on the total weight of a resulting waterborne polyurethane, of the isocyanate crosslinker and from 0.1 to 5.0% of the dry thermoplastic microfibers described above to:

10 to 60%, e.g., 10 to 50%, 10 to 40%, 10 to 35%, or 15 to 25% of a polyol, 10 to 40%, e.g., 15 to 40%, or 15 to 35% $TiO2$, 10 to 60%, 15 to 50%, e.g., 25 to 45% water, and other optional components;

and applying the thus formed waterborne polyurethane coating composition, to a surface, such as a vertical surface, e.g. a wall.

Some particular embodiments of the invention provide a method for reducing or preventing roller line and/or sag from a waterborne 2 pack polyurethane coating, in particular a wall coating, by adding 0.1 to 5.0%, e.g., 0.2 to 3.0% by weight based on the weight of a waterborne 2 pack polyurethane coating composition, of dry polyolefin microfibers as described above to a composition comprising:

10 to 50% or 10 to 40%, e.g., 10 to 35%, or 15 to 25% by weight based on the total weight of the waterborne polyurethane coating composition of a polymeric resin comprising hydroxy groups, 10 to 50% or 10 to 40%, e.g., 10 to 35%, or 15 to 25% of an isocyanate crosslinker, 15 to 40%, e.g., 15 to 35% $TiO_2$, and 15 to 50%, e.g., 25 to 45% water;

or by adding, in any order, 10 to 50%, 10 to 40%, 10 to 35% or 15 to 25% of an aliphatic isocyanate crosslinker, and from 0.1 to 5.0%, dry polyolefin microfibers having a fiber length of 1 mm or less and a diameter of from 0.001 to 0.025 mm, to 10 to 50%, 10 to 40%, e.g., 10 to 35%, or 15 to 25% by weight based on the total weight of the waterborne polyurethane coating composition of a polymeric resin comprising hydroxy groups, 15 to 40%, e.g., 15 to 35% $TiO_2$, 15 to 50%, e.g., 25 to 45% water, and other optional components;

and applying the thus formed waterborne polyurethane coating composition, to a surface, such as a vertical surface, e.g. a wall.

EXAMPLES

The following examples employ one or more of the following commercial materials:

ESS5F MiniFibers® dry HDPE fibers ~0.1 mm long, ~0.005 mm diameter

Bayhydrol® HD 2016 acrylic polyol resin in water-42% Solids

Bayhydrol® HD 2017 acrylic polyol resin in water-51% Solids

Bayhydur® HD 2018 hexamethylene diisocyanate based crosslinker

Disperbyk® 190 block copolymer dispersant

Byk® 3455 polyether modified siloxane flow leveling agent

Byk® 028 polysiloxane/polyglycol defoamer

Byk® 3441 Solution of an acrylate copolymer with 47%-48% of 2-Methoxymethylethoxypropanol DSX®1514 thickener Examples 1-4

A series of coating compositions according to the table below were prepared using standard means and applied by roller to a wall and allowed to cure. Formulations 1, 2 and 3 were white matte coatings, formulation 4 contained additional colorants as shown.

| | Formulation | | | |
|---|---|---|---|---|
| | 1 | 2 | 3 | 4 |
| | Approx. total wt % water | | | |
| | ~37% water | ~37% water | ~40% water | ~36% water |
| Water | 14.20 | 14.0 | 18.9 | 12.66 |
| Disperbyk ® 190 | 0.70 | 0.70 | 0.60 | 0.60 |
| Byk ® 3455 | 0.00 | 0.80 | 0.00 | 0.70 |
| Byk ® 028 | 0.85 | 0.00 | 0.70 | 0.76 |
| Byk ® 3441 | 0.00 | 0.80 | 000 | 000 |
| DSX ® 1514 13.4% solids | 3.80 | 2.85 | 4.72 | 2.60 |
| ESS5F MiniFibers | 0.40 | 1.9 | 1.90 | 0.35 |
| $TiO_2$ | 22.25 | 22.90 | 20.60 | 20.70 |
| Bayhydrol ® HD 2016, 43% solids | 28.35 | 27.87 | 18.80 | 25.22 |
| Bayhydrol ® HD 2017, 51% solids | 7.10 | 7.00 | 12.57 | 6.30 |
| Total hydroxy resin solids | 20.00 | 19.60 | 17.20 | 17.10 |
| Bayhydur ® HD 2018 | 21.50 | 21.25 | 21.15 | 19.25 |
| Color package | 0.00 | 0.00 | 0.00 | 10.9 |

The Color package for Formulation 4:

| | Total wt % | wt % due to water |
|---|---|---|
| Pure Options B Lamp Black | 4.04 | 1.62 |
| Pure Options F Red Oxide | 1.35 | 0.34 |
| Pure Options AX Yellow | 4.71 | 1.65 |
| Pure Options C Yellow Oxide | 0.81 | 0.20 |

Comparative coatings with a similar composition but without the microfibers were also prepared applied to a wall and cured.

Examination of the cured coatings revealed that each of the polyurethane coatings 1 through 4 of the invention containing the microfibers shown had a smooth surface with no unwanted lines and no sag. The comparative coatings exhibit roller lines and varying degrees of sag.

Also for comparison, polyacrylate coating formulations according to the table below were prepared using the same microfibers used in the two pack polyurethane systems. The preparation of the polyacrylate formulations comprised adding the microfibers to a mixture containing the first 5 components of the table, mixing for 40 minutes, adding the benzoyl peroxide and mixing for 30 to 60 seconds, after which the formulation was immediately applied to a substrate for testing.

| | C1 | C2 | C3 | C4 |
|---|---|---|---|---|
| Methyl methacrylate | 74.30 | 73.90 | 72.80 | 71.30 |
| Triethylene glycol dimethacrylate | 6.00 | 5.95 | 5.85 | 5.74 |
| Methyl methacrylate/butylacrylate copolymer | 17.20 | 17.20 | 16.95 | 16.60 |
| Hydroxyethyl p-toluidine | 1.0 | 1.0 | 1.0 | 1.0 |
| BHT | 0.10 | 0.10 | 0.10 | 0.10 |
| ESS5F MiniFibers | 0.13 | 0.50 | 2.0 | 4.0 |
| Benzoyl peroxide | 1.0 | 1.0 | 1.0 | 1.0 |

A drawdown bar was used to prepare 15 mil and 30 mil coatings of the above polyacrylate coating formulations, which were cured for 40 to 60 minutes. The resulting films all exhibited noticeable sagging and were not smooth. A similar polyacrylate coating formulation containing 3.8 wt % Cab-O-Sil® M5 silica powder in place of the microfiber of the invention was also prepared and produced smooth films with no sagging when tested accordingly.

Results similar to those from the above polyacrylate films were obtained when repeating the tests with an epoxy coating formulation.

What is claimed is:

1. A waterborne polyurethane coating composition comprising, by weight based on the total weight of the waterborne polyurethane coating composition: 10 to 60%, of a polyol, 5 to 60%, of an isocyanate crosslinker, 0.1 to 5.0%, thermoplastic microfibers having a fiber length of 1 mm or less and a diameter of from 0.001 to 0.025 mm, 10 to 40% TiO$_2$, and 10 to 60% water, wherein the thermoplastic microfibers are polyolefin microfibers.

2. The waterborne polyurethane coating composition according to claim 1 wherein the polyol is a polymeric resin comprising hydroxy groups and the isocyanate crosslinker is an aliphatic isocyanate crosslinker.

3. The waterborne polyurethane coating composition according to claim 1 comprising, by weight based on the total weight of the waterborne polyurethane coating composition: 10 to 35% of a polymeric resin comprising hydroxyl groups, which resin comprises one or more acrylate and/or methacrylate polymer or co-polymer comprising a plurality of free hydroxyl groups, 10 to 35% of an aliphatic isocyanate crosslinker, 0.1 to 5.0%, polyolefin microfibers having a fiber length of 1 mm or less and a diameter of from 0.001 to 0.025 mm, 15 to 40% TiO$_2$, and 15 to 50% water.

4. The waterborne polyurethane coating composition according to claim 3 wherein the polyolefin microfibers comprise high density polyethylene and/or low density polyethylene microfibers.

5. The waterborne polyurethane coating composition according to claim 3 wherein the polyolefin microfibers have a fiber length of 0.005 to 0.50 mm and a diameter of from 0.001 to 0.010 mm.

6. The waterborne polyurethane coating composition according to claim 5 wherein the polyolefin microfibers have a fiber length of from 0.010 to 0.25 mm, and a diameter of from 0.002 to 0.007 mm.

7. The waterborne polyurethane coating composition according to claim 1 wherein the isocyanate crosslinker comprises hexamethylene diisocyanate, hexamethylene diisocyanate dimer, hexamethylene diisocyanate trimer, and/or hexamethylene diisocyanate oligomers derived from 4 or more hexamethylene diisocyanate units.

8. The waterborne polyurethane coating composition according to claim 3 wherein the aliphatic isocyanate crosslinker comprises hexamethylene diisocyanate, hexamethylene diisocyanate dimer, hexamethylene diisocyanate trimer, and/or hexamethylene diisocyanate oligomers derived from 4 or more hexamethylene diisocyanate units.

9. The waterborne polyurethane coating composition according to claim 8 comprising: 15 to 25% of the polymeric resin comprising hydroxyl groups, 15 to 25% of the aliphatic isocyanate crosslinker, 0.2 to 3.0% of the polyolefin microfibers, 15 to 35% TiO.sub.2, 25 to 45% water, and 0 to 25% total of pigments, surfactants, dispersants, rheology modifiers, leveling agents, anti-foaming agents, other reactive or non-reactive resins, hardeners, cure accelerators, catalysts, delaying or blocking agent, solvents, reactive diluents, wetting agents, stabilizers, inhibitors, reinforcing agents, cement, sand, quartz silica, CaCO$_3$, CaSO$_4$, BaSO$_4$, detergents, antistatic material, anti-slip agent, matting agent, UV blockers, hindered amine light stabilizers and/or antioxidants.

10. The waterborne polyurethane coating composition according to claim 9 comprising, 3 to 20% total of pigments, surfactants, dispersants, rheology modifiers, leveling agents, anti-foaming agents, other reactive or non-reactive resins, hardeners, cure accelerators, catalysts, delaying or blocking agent, solvents, reactive diluents, wetting agents, stabilizers, inhibitors, reinforcing agents, cement, sand, quartz silica, CaCO$_3$, CaSO$_4$, BaSO$_4$, detergents, antistatic material, anti-slip agent, matting agent, UV blockers, hindered amine light stabilizers and/or antioxidants.

11. The waterborne polyurethane coating composition according to claim 9 wherein the polyolefin microfibers have a fiber length of 0.005 to 0.50 m, a diameter of from 0.001 to 0.010 mm and comprise high density polyethylene and/or low density polyethylene microfibers.

12. The waterborne polyurethane coating composition according to claim 1, which is a wall coating composition.

* * * * *